United States Patent
Porter

[11] Patent Number: 5,533,700
[45] Date of Patent: Jul. 9, 1996

[54] HOLDER FOR A CONTAINER

[76] Inventor: Dennis Porter, 3036 Karen Ave., Long Beach, Calif. 90808

[21] Appl. No.: 389,255

[22] Filed: Feb. 16, 1995

[51] Int. Cl.⁶ ..................................... A47K 1/08
[52] U.S. Cl. ........................ 248/311.2; 224/926
[58] Field of Search .................. 248/311.2, 313, 248/314, 316.2, 316.3, 310, 309.1; 224/926

[56] References Cited

U.S. PATENT DOCUMENTS

| | | | |
|---|---|---|---|
| D. 35,245 | 10/1901 | Hooper | 248/311.2 X |
| 2,215,411 | 9/1940 | Sebring | 248/311.2 |
| 3,317,171 | 5/1967 | Kramer | 248/311.2 X |
| 4,406,928 | 9/1983 | MacKenzie | 179/146 R |
| 4,799,638 | 1/1989 | Allen | 248/311.2 |
| 4,928,873 | 5/1990 | Johnson | 248/311.2 X |
| 5,135,195 | 8/1992 | Dane | 248/311.2 |
| 5,154,380 | 10/1992 | Risca | 248/311.2 X |
| 5,302,000 | 4/1994 | Ayotte | 248/311.2 X |

Primary Examiner—Ramon O. Ramirez
Attorney, Agent, or Firm—L. Lee Humphries

[57] ABSTRACT

A holder for a container has fingers capable of holding various sizes of containers, particularly, the large-sized containers. The fingers are attached to a base, extend upwardly and curve outwardly at their upper ends. The base fits into a cup holder or the drink caddy found in automobiles or at the theater or sporting events.

8 Claims, 7 Drawing Sheets

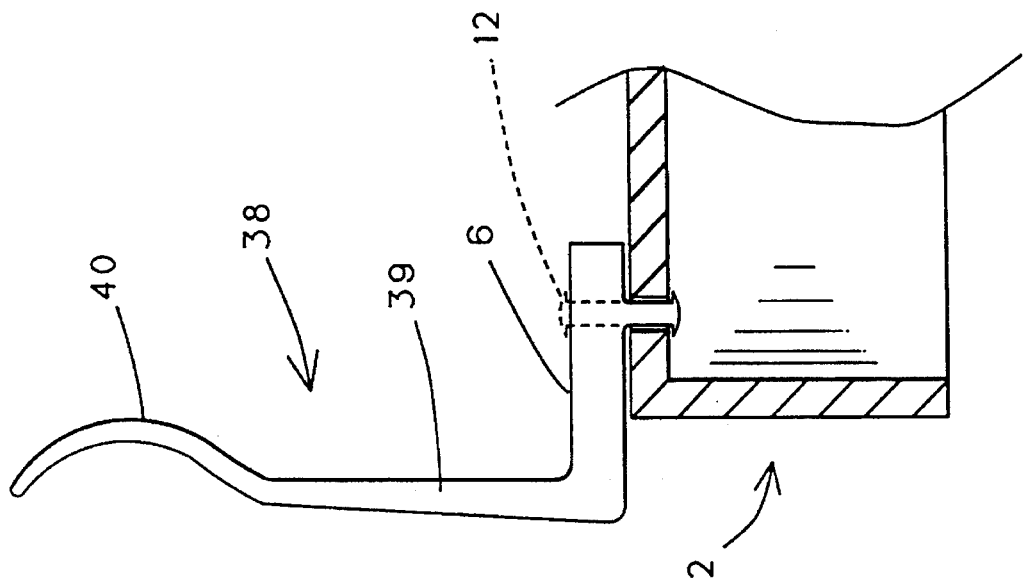
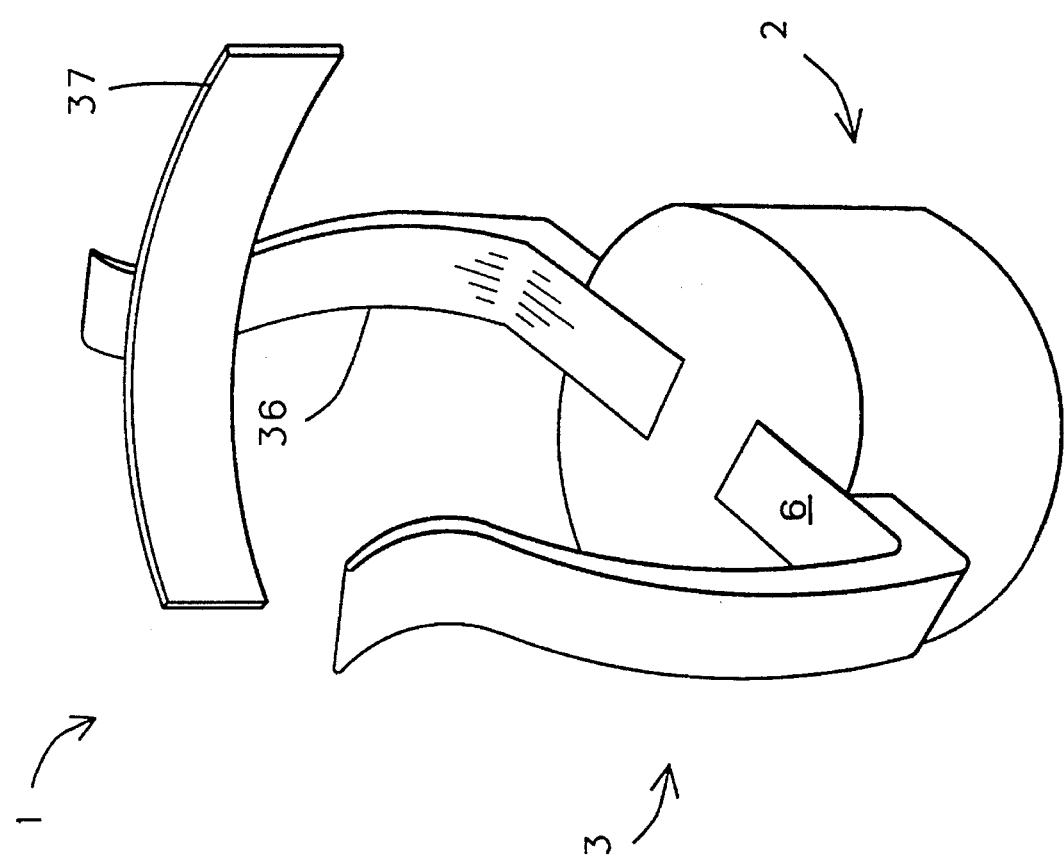

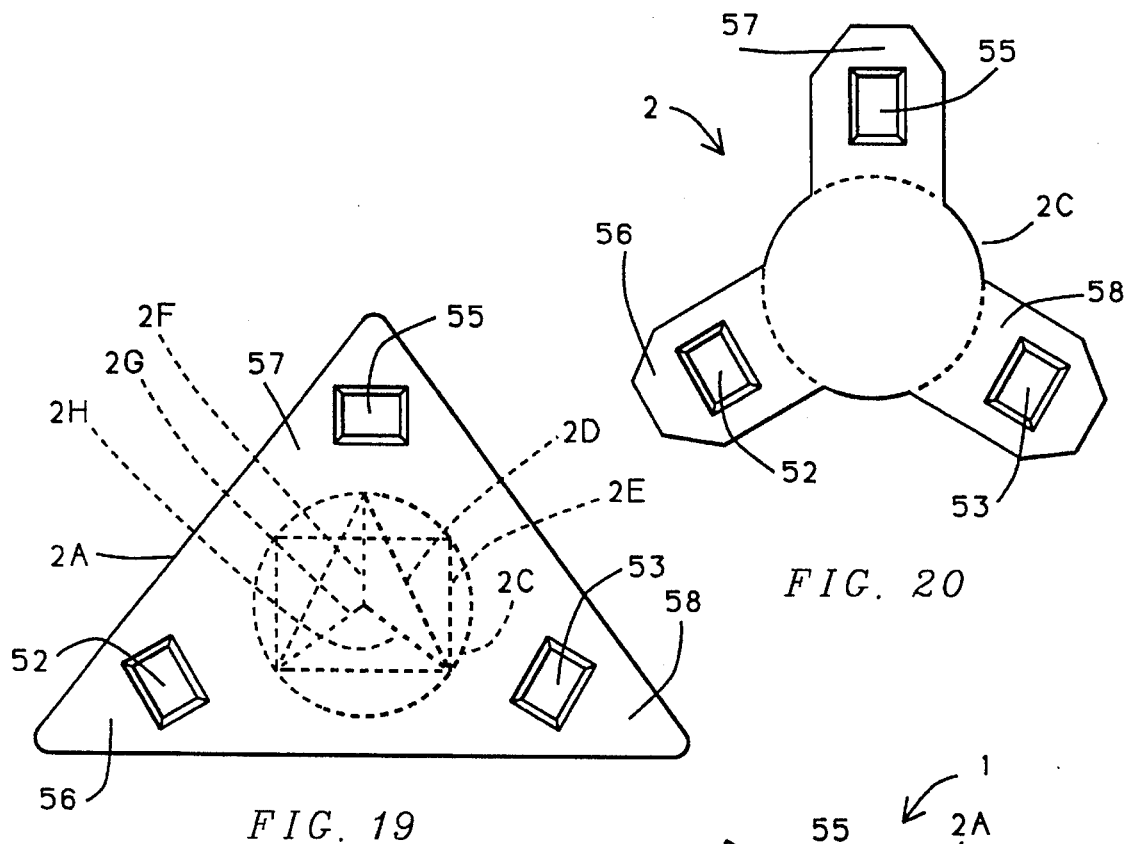
FIG. 20
FIG. 19
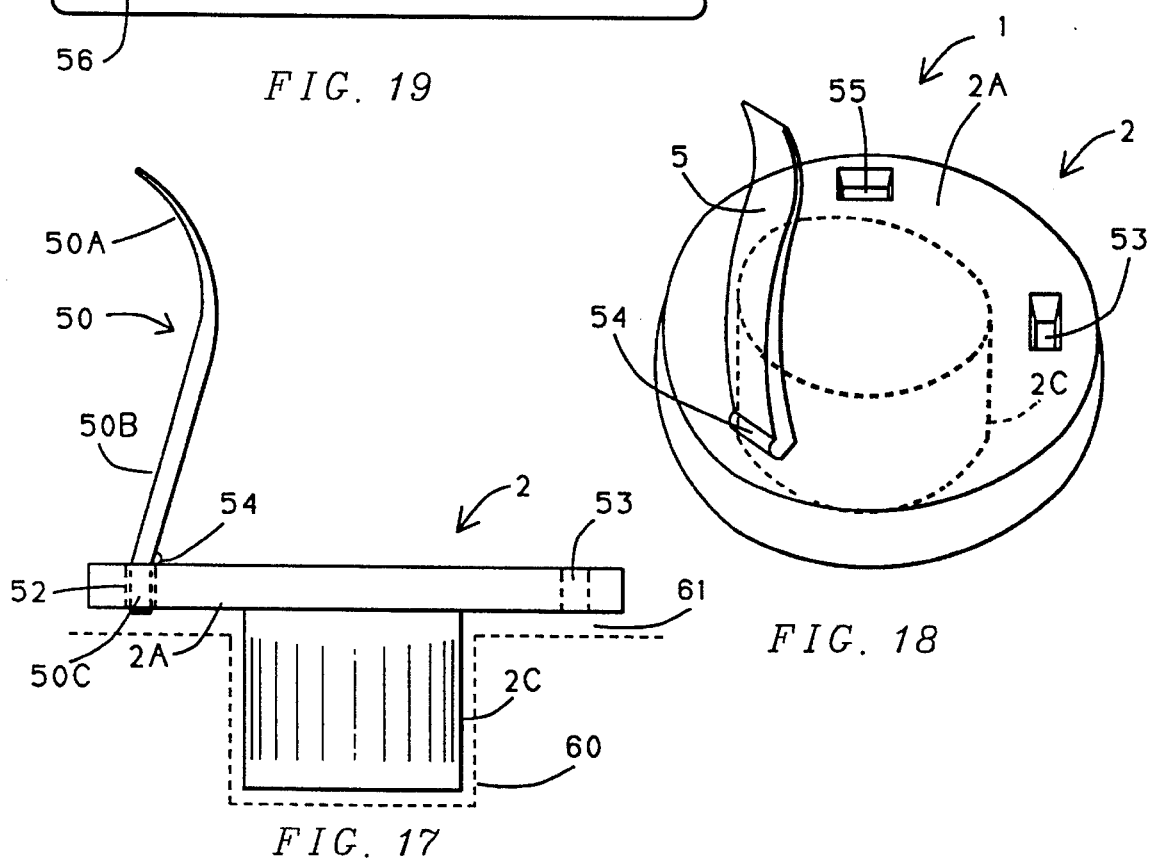
FIG. 18
FIG. 17

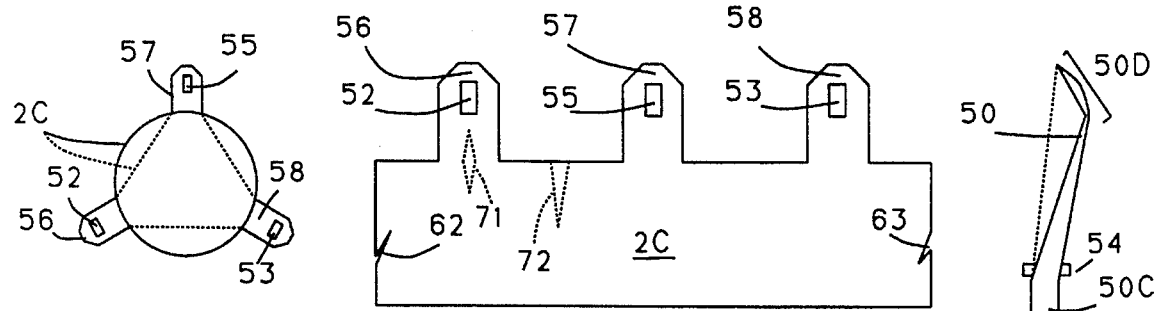
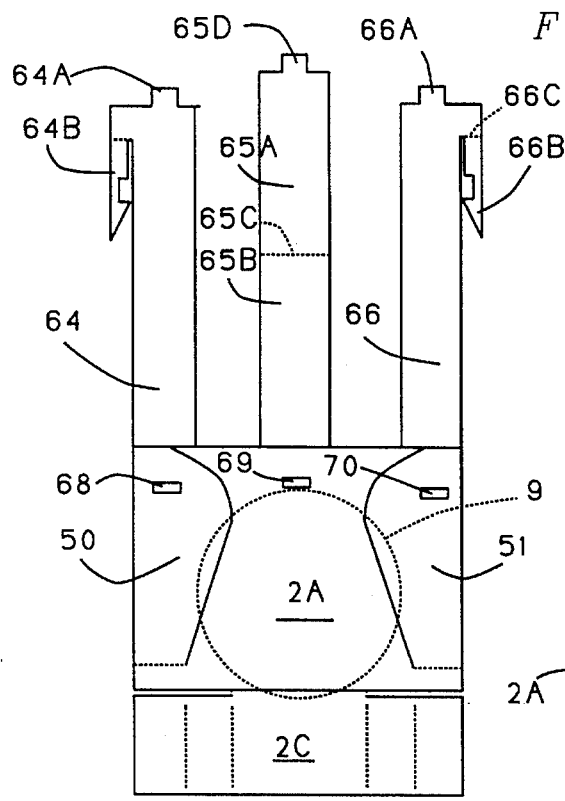
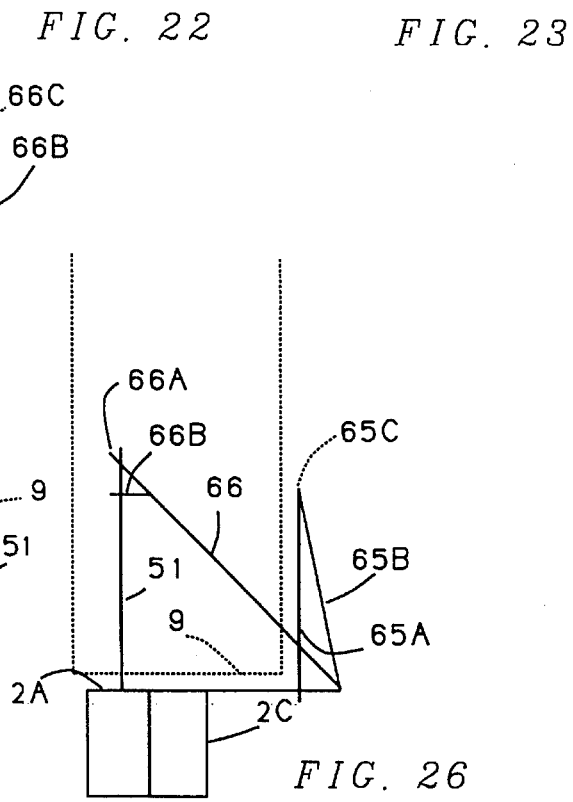
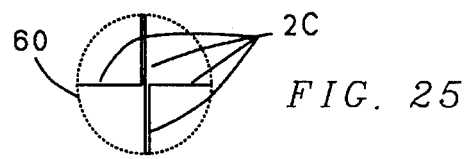
FIG. 21  FIG. 22  FIG. 23  FIG. 24  FIG. 25  FIG. 26

HOLDER FOR A CONTAINER

This invention relates to a holder for a container, such as a drink container. This holder is suitable for holding various sizes and shapes of containers, but is particularly adapted for holding a large-sized, circular container against spilling, in an automobile. There are various normal-sized cup holders available and most newer automobiles have a normal-sized cup receptacle or drink caddy which is less than 3" in diameter and is thus too small to hold the larger-sized drink containers commonly sold in mini-markets, service station markets and convenience stores. Such larger-sized drink containers are customarily more than 3" in diameter. The common 2-liter soft drink bottle is approximately 3½" in diameter. This invention accommodates such larger-sized drink containers and, also, accommodates the 2-liter bottles very well.

The device of the invention adapts such small-sized, or normal-sized holders, or receptacles, to hold the large-sized containers. Of course, such larger containers may hold a drink, popcorn or other consumable or even, a non-consumable. Also, the invention may be used as well, for example, at home, in the theater, or at sporting and at other events and in other places.

Drink containers and other consumable containers usually have a circular circumference although other shapes do exist. This invention is mainly applicable to a holder for circular containers, which are often tapered in shape, although the holder of the invention is capable of holding variations in the shape, such as elliptical, rectangular or square circumferences.

PRIOR ART

Previous holders, especially those found in automobiles or those available for use in automobiles, have been designed to fit and hold a particular size cup or soft drink can. Such holders are usually much too small for the larger containers which are commonly now in use. If such holders are made larger, they are then too large to hold the small containers, which would shift around and fall from such larger holders. In addition, such holders are often constructed as shallow recesses and have no upwardly-extending structure to hold tall containers against tipping over.

Other holders are marketed which are slidably adjusted to fit the container. Such holders are more complex and more expensive to produce.

Various presently-available holders require special structure to mount or hold the holders in an automobile. Suction cups, window hooks, peel-and-stick swatches, screws and straps are among the structures used to mount such holders.

BRIEF DESCRIPTION OF THE INVENTION

The device of the invention, in its preferred form, has a cylindrical base to which is attached three or more flexible fingers. The fingers are spaced around the circumference of the base and extend upwardly therefrom. In the preferred embodiment, the fingers first extend outwardly from the base, then upwardly. In extending upwardly, the fingers extend inwardly, then outwardly. Thus, the fingers extend in an "S" shape. To conserve material in the manufacture of the invention, the base may be hollow.

The diameter of the base of the invention is approximately the same as that of a soda can or the common cup, which is slightly larger than the soda can. Thus, the base of the invention fits into the most commonly found receptacles in an automobile or theater. A collar, made of foam rubber or other suitable material, may be used to adapt the base to fit larger size receptacles.

Being flexible, the fingers receive and hold various sizes of containers and are well-adapted to hold the larger-sized drink containers. Of course, the fingers must be of sufficient stiffness, in their flexibility to retain a drink container and its contents upright, against expected jarring or, if used in an automobile, customary braking and sudden stops.

Other embodiments include only two flexible fingers with one having a crosspiece to provide stabilization of the container. In various embodiments, the flexible fingers may be attached to the top of the base, the side of the base, to recesses in the base or by other suitable attachment.

It is, therefore, an object of this invention to provide a holder for a container which is larger than the customary size.

Another object of this invention is to provide a holder for a circular container, which holder has flexible fingers adapted to receive various sizes of containers.

It is another object of this invention to provide a holder for a variety of container sizes and shapes.

Yet another object of this invention is to provide a relatively simple, economically-manufacturable, highly-adaptable holder for large, circular containers.

BRIEF DESCRIPTION OF THE DRAWINGS

Further objects and features will become apparent from the following description in which:

FIG. 11 is a perspective of the invention having only two fingers, one of which has a crosspiece for stabilizing large-sized containers.

FIG. 12 is a side view of a flexible finger of different shape, attached to the top of the base which is partially shown and which is in cross-section.

FIG. 17 is a side view of a base having a cap into which the fingers are inserted.

FIG. 18 is a Perspective of a circular cap showing how the fingers may be inserted into the cap.

FIG. 19 is a top view of a base having a cap of triangular shape and illustrates various configurations of the base.

FIG. 20 is a top view of an alternate embodiment in which the base has projecting tabs into which the fingers are inserted.

FIG. 21 is top view of an alternate embodiment of the base, having projecting tabs into which the fingers are inserted.

FIG. 22 is a base which is stamped or die-cut out of a material which is then folded into the form of the base.

FIG. 23 is a side view of a finger which may be inserted into the holes in the tabs of the base.

FIG. 24 is a holder which is stamped or die-cut out of a material which is then folded into the form of the holder.

FIG. 25 is a bottom view of the base of FIG. 24, after it is folded into its base configuration.

FIG. 26 is a side view of the holder of FIG. 24, after it is folded into its desired shape.

DETAILED DESCRIPTION

Figure 1:
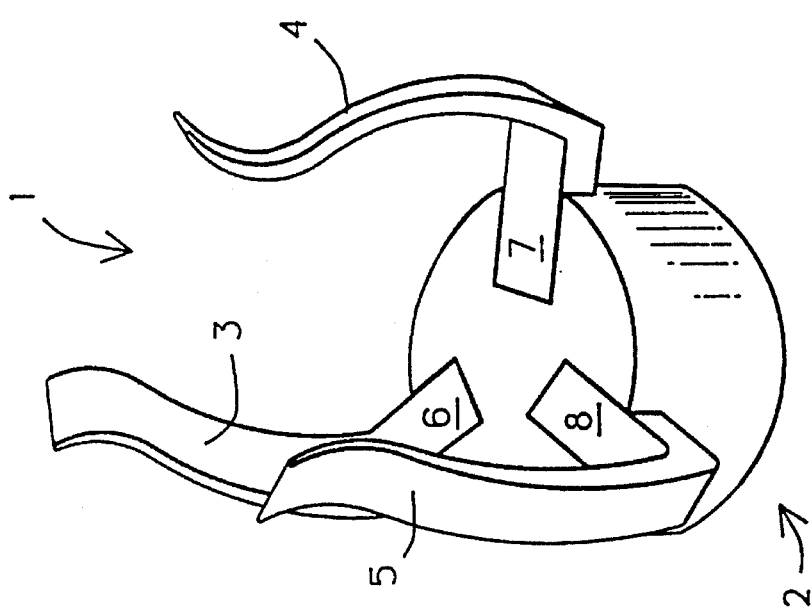
FIG. 1 a perspective view of the holder, showing a base and flexible fingers for holding a container.

In FIG. 1, which is a perspective view, there is shown holder 1, a base 2 and flexible fingers 3, 4 and 5 for holding a container (not shown). It may be seen that fingers 3, 4 and are arranged around the perimeter of the base 2 and extend upwardly from a "substantial distance" outside the perimeter of the base. The "substantial distance" is approximately ½" but may be from ¼" to ¾". Thus, a container, having a base diameter substantially larger than the diameter of base 2 may be accommodated within the holder 1.

In this embodiment, it is noted that each of the feet 6, 7, and 8 of the flexible fingers 3, 4 and 5 is inset into a recess within the base 2. It is noted that the top surfaces of feet 6, 7, and 8 are flush with the top surface of base 2. This is the preferable embodiment, however, the top surfaces of feet 6, 7 and 8 could lie above the top surface of base 2, thereby providing three surfaces upon which a container would rest. Alternatively, the top surfaces of feet 6, 7 and 8 could lie below the top surface of base 2 which latter surface would then form the surface upon which a container would rest.

various means of attaching fingers to the base may be used. The word "attached" is intended to include within its meaning "fastened", "inserted", "adhered", or otherwise connected. In some instances, discussed hereafter in connection with FIGS. 10 and 17 through 20, the fingers are attached by simply being inserted into the base or such fingers may be adhered or otherwise fastened to the base.

In FIG. 1, fingers 3, 4 and 5 have feet 6, 7 and 8 which are used to connect the fingers to the base. Such feet 6, 7 and 8 are connected by fastening means, including, but not limited to, rivets, studs, screws, stubs, bolts, adhesives, epoxy or other means. Base 2 may be solid but, to conserve material, is preferably hollow except for material surrounding the recesses.

The holder is preferably made of plastic which allows mass production through the use of injection molding. However, other methods of production may be used as well as other materials. I have made suitable models from wood. Paper, cardboard and similar materials are suitable provided the holder, particularly the fingers, are constructed having sufficient strength. A holder of the kind described herein may be constructed from folded paper, cardboard or similar materials. I have found that the injection molding of polypropylene is very suitable. Other thermoplastics or thermosetting materials may also be used. Polyethylene, polycarbonates, polyvinyl chloride and mixtures of such plastics or other plastics may be used and found to be quite suitable. Polypropylene, in the proportions and dimensions indicated below, is readily adapted to provide suitable flexibility to the fingers 3, 4 and 5 to allow them to spring apart and receive large containers. A great deal of the flexibility of fingers 3, 4 and 5, if not most of their flexibility, is obtained in the upper half or two-thirds of the finger.

The dimensions may be varied, of course, but suitable flexibility of the fingers can be achieved by making the foot of each finger approximately ¼" in depth, approximately ¾" wide and 1.5" long. Each finger, at its lower end, where it connects to the foot, is ¾" wide and ¼" thick, but each finger tapers to approximately ⅛" thickness at its upper end. The width of the finger remains approximately the same, top and bottom. However, a finger could be made to flare in width at either its top or bottom, or both. Each finger is approximately 4" long and, preferably, extends artistically in an "S" curve. Each finger may, however, be angulated in the general shape of an "S", rather than curved. It may be, too, that the "S" curve is very slight or very pronounced. It is to be appreciated that a stronger material would allow narrower and thinner fingers to be used.

Base 2 is approximately 2 ⅝", preferably 2 9/16", in outer diameter to fit within a receptacle of approximately 2 ¾". Base 2 is approximately 1 ¾" high and, in the hollow embodiment, the wall of the base is approximately ⅛" thick.

Figure 16:
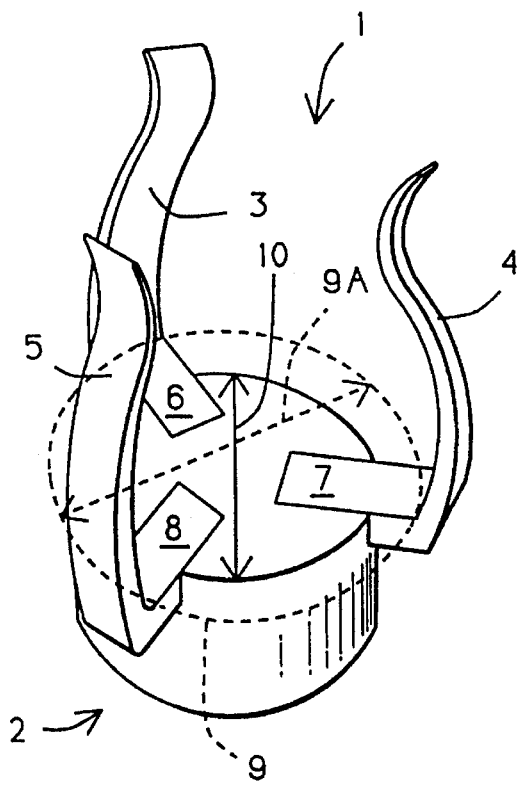
FIG. 16 is the preferred embodiment of the invention, illustrating circumferential dimensions.

When the fingers are mounted as shown in FIG. 1, a circular area, shown in dotted line 9, FIG. 16, having a diameter 9A of approximately 3 ½" is provided, for receiving the base of large-sized drink container. An ordinary-sized container would have a base of approximately diameter 10, which is approximately 2 ⅝" and which is the same as the outside diameter of base 2. Flexible fingers 3, 4 and 5 will also firmly hold the ordinary sized container and intermediate-sized containers in place.

Base 2 is adapted to fit within the receptacles customarily provided in automobiles, portable caddies, at the theater and at other facilities and events.

The dimensions of the holder may be appropriately scaled to fit particular, desired sizes of drink containers and receptacles.

Figure 2:
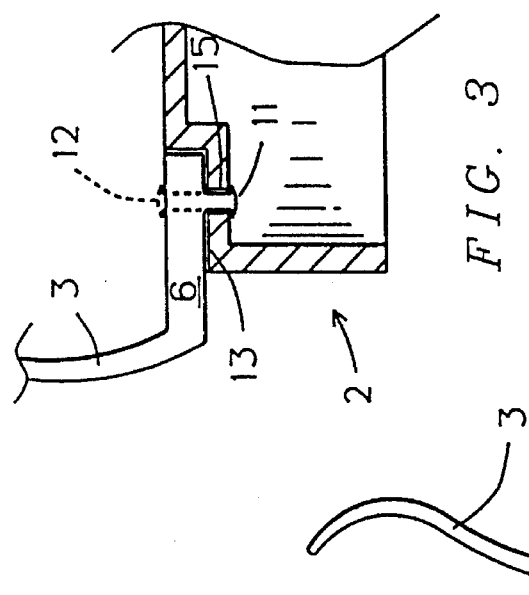
FIG. 2 is a partial side view of one embodiment in which the flexible fingers are attached to the top of the base which is partially shown and which is in cross-section.

FIG. 2 is a side view of one of the flexible fingers in which the foot, or end, 6 of the finger 3 is attached to the top of the base 2 by rivet 11 which is molded as part of base 6. It is to be appreciated that foot 6 may be attached to base 2 by such rivet, nut and bolt, adhesive, screw means or other suitable attachment means. Base 2 is partially shown and is shown in cross-section.

It is noted in this embodiment that the foot 6 sits on top of the base 2 and is not inserted into a recess in the base. In order to prevent foot 6 from rotating, it may be desirable to additionally attach it by adhesive or rivet means similar to and in addition to rivet 11. Alternatively, ridges could be formed in base 2 on either side of foot 6, to prevent such rotation.

Alternatively, in FIG. 2, a rivet 12, shown in dotted lines, may be molded as part of the base 2, and inserted through a hole in foot 6.

The preferred mode of manufacture is to cast the rivet 11 as part of the foot 6. If the rivet has a suitable dimension of its head slightly larger than hole 15 and if the head is thin enough to be flexible, it can be forced into locking fit in base 2, for a secure attachment.

Figure 3:
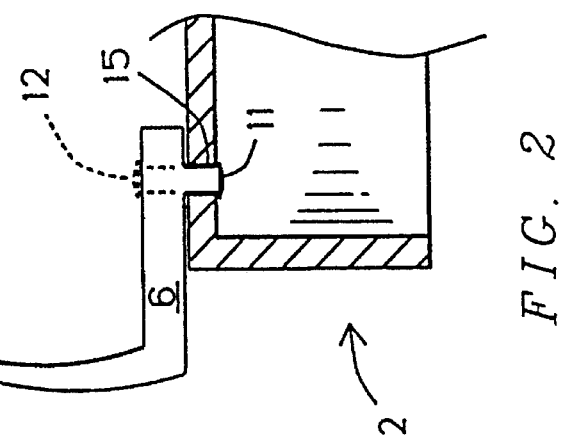
FIG. 3 is an alternate embodiment in which the lower part of the flexible finger rests in a recess in the base which is partially shown and which is in cross-section.

FIG. 3 is an alternate embodiment in which the foot 6 of flexible finger 3 rests in a recess 13 in base 2 and is attached thereto by a rivet 11, integral with foot 6, as shown, or by screw or other means. Again, such rivet 11 may be cast, or molded as part of foot 6 and enter through hole 15 in base 2, as shown. Alternatively, the rivet may be cast as part of the base 2, as shown by rivet 12, in dotted lines, and extend through base 2 through a hole therein, thereby attaching foot 6 to base 2.

Figure 4:
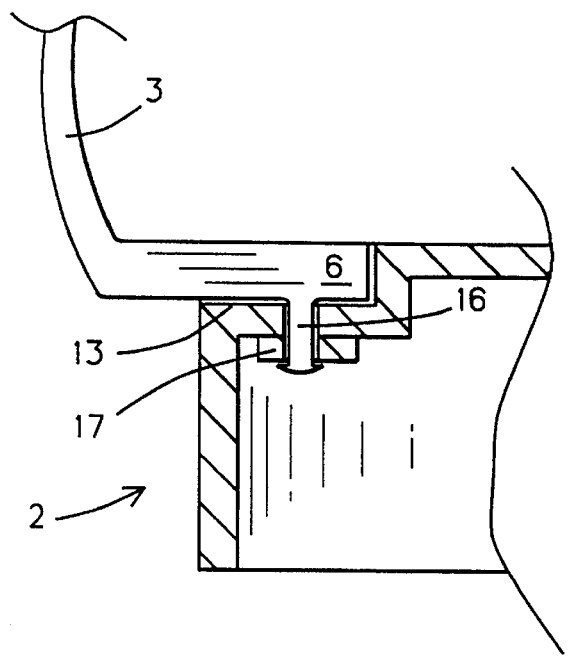
FIG. 4 is a view of the lower portion of a flexible finger showing an integral rivet for attaching the finger to the base which is partially shown and which is in cross-section. The base has a boss for increased strength at the location of the rivet.

FIG. 4 is a view of the lower portion, or foot 6, of a flexible finger 3 showing an integral rivet 16 for attaching the finger 3 to the base 2 which is partially shown and which is in cross-section. The base has a boss 17 for increased strength at the location of the rivet 16 which is molded as part of foot 6 or otherwise firmly attached thereto. It is noted that foot 6 fits into recess 13 of base 2 as in FIG. 3. Boss 17 provides added strength to the base 2 to prevent the rivet 16 from tearing through base 2 and causing the finger 3 to separate from base 2 when in use.

It is preferred that rivet 11 be integrally formed of plastic with the foot 6 of flexible finger 3, as shown in FIG. 4. Such integral, plastic rivet, or stub, 16 is formed with a slight, thin head that will slip into hole 15 through the upper end of the hole 15 but once the head of the rivet 16 is fully pushed through hole 15, the rivet head resiliently assumes its original shape, flexes outwardly and will not slip out. Hole 15 may be slightly enlarged toward its upper end, that is, slightly tapered, to allow ready entry of the head of an integral plastic rivet 16 that is inserted from the upper end of hole 15.

Figure 5:
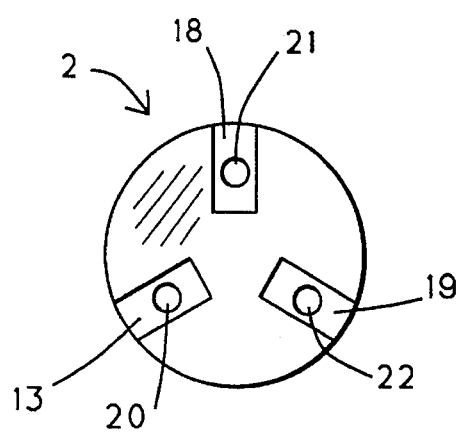
FIG. 5 is a top view of a base showing three recesses for mounting fingers.

FIG. 5 is a top view of a base 2 showing three recesses 13, 18 and 19 having holes 20, 21 and 22 in the base 2, to receive rivets, for mounting fingers. Such holes 20, 21 and 22 also would permit fastening by other means such as nut and bolt, screw means, or other fastening means attaching the flexible fingers to the base. Holes may be drilled through the bases of the fingers if it is desired to use, say, machine bolts to fasten the fingers to the base through holes such as 20, 21 and 22.

Figure 6:
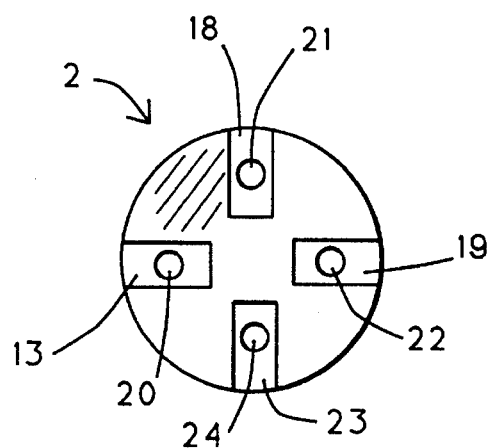
FIG. 6 is a top view of a base showing four recesses for mounting fingers.

FIG. 6 is a top view of a base 2 showing four recesses 13, 18, 19 and 23 and four holes 20, 21, 22, and 24 in the base of the recesses, for mounting four flexible fingers.

Figure 7:
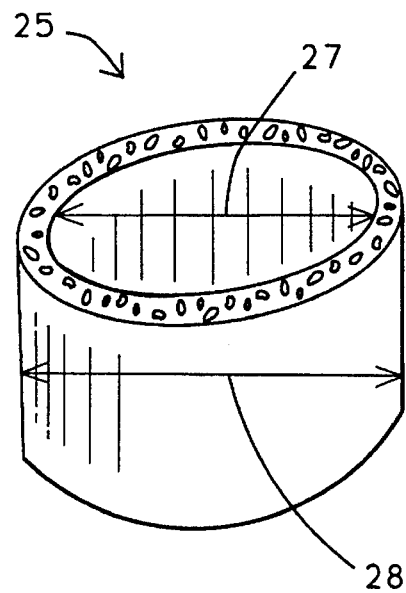
FIG. 7 is a collar for adapting the base to fit larger-sized receptacles.

FIG. 7 is a collar 25, made of foam rubber, or other suitable material, for adapting the base 2 of the drink holder 1, FIG. 1, to fit automobile, theater or other drink holder receptacles which receptacles are larger than the normal size receptacles of approximately 2 ¾" in diameter. The inner diameter 27 of collar 25 is approximately 2 ¾", to receive the base 2 of the drink holder 1. The outer diameter 28 of collar 25 is approximately ½" larger than its inner diameter 27, giving collar 25 an outside diameter of approximately 3 ¼".

Even in the circumstance of the receptacle being large enough to receive a large-sized container, such receptacle seldom provides stability to the upper portion of the large-sized container. Thus, the device of the invention is useful even when large-sized receptacles are available.

If collar 25 is made of a flexible, compressible material, collar 25 may be used to fit the base 2 of drink holder 1 into a range of receptacles of various inner diameters.

Figure 8:
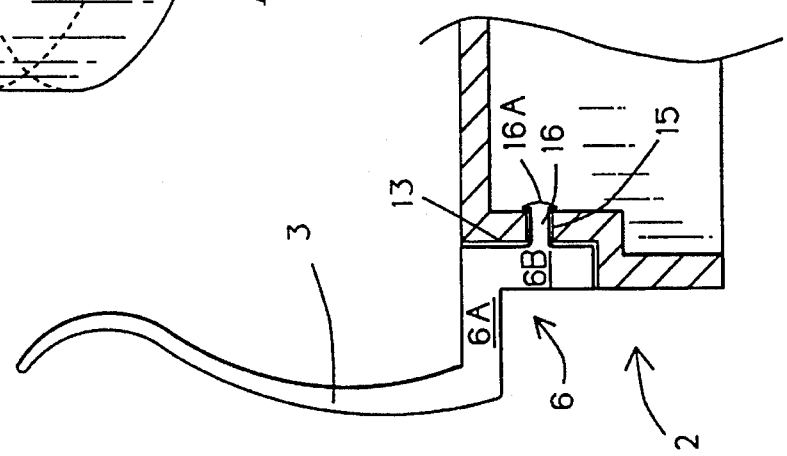
FIG. 8 shows a flexible finger mounted to the side of the base which is partially shown and which is in cross-section.

FIG. 8 shows,a flexible finger 3 and its L-shaped foot 6, comprised of portions 6A and 6B. Portion 6A of foot 6 extends horizontally outwardly from base 2 and portion 6B extends vertically. Portion 6B of foot 6 is mounted to the side of the base 2 which is partially shown and which is shown in cross-section. Portion 6B of foot 6 is comprised of a stub, or rivet, 16 which extends through hole 17 in base 2. Stub 16 has a head 16A. Base 2 has a vertically-disposed recess 13 to receive foot 6. Recess 13 lies at the circumference of base 2. Finger 3, in extending upward, curves outwardly and then inwardly. It is noted that foot 6 could be attached to a base 2, without there being a recess 13 to receive foot 6. In such embodiment, foot 6 may be adhered, fastened or otherwise attached to the circumference of base 2, in a manner similar to that shown in FIG. 8.

Figure 9:
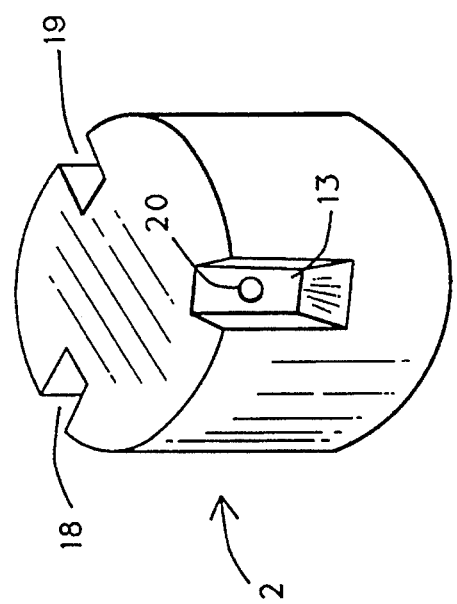
FIG. 9 is a perspective view of the base of FIG. 8, showing vertical recesses in the top and side of the base, into which the feet of flexible fingers may be fitted.

FIG. 9 is a perspective view of the embodiment of base 2, shown in FIG. 8, showing vertical recesses 13, 18 and 19 into which the feet of flexible fingers may be fitted. Hole 20 is adapted to receive the rivet of a foot, such as rivet 16 shown in FIG. 8.

Figure 10:
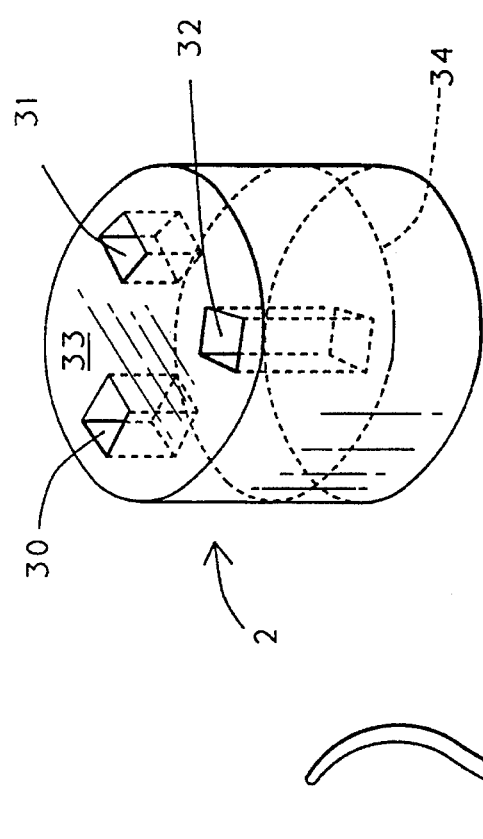
FIG. 10 is a perspective of one embodiment of the base in which there are recesses in the top of the base, for receiving and mounting the flexible fingers.

FIG. 10 is a perspective of another embodiment of base 2 in which there are recesses 30, 31 and 32 in the top of the base, for receiving and mounting the feet of flexible fingers. Base 2 may be cast to be solid from its top surface 33 to, for example, dotted line 34. Recess 32 is shown extending entirely through base 2 to such dotted line 34. Alternatively, the recesses 30, 31 and 32 may be blind recesses, as shown by the dotted lines of recesses 30 and 31.

FIG. 11 is a perspective of the holder having only two fingers 3 and 36, finger 36 having a crosspiece 37 for stabilizing large-sized containers. Crosspiece 37 is curved in order to vartially encircle the container being held, (not shown). Crosspiece 37 may be molded as part of finger 36 or may be a separate piece adhered or otherwise fastened to finger 36. It is to be appreciated that crosspiece 37 may be faired or chamfered along its top edge in order not to catch the bottom of the container as it is being inserted. Alternatively, crosspiece 37 may be placed on the back side of finger 36.

FIG. 12 is a side view of a flexible finger 38 attached to the top of the base 2 which is partially shown and which is in cross-section. Finger 38, in extending upwardly from base 2 and foot 6, has a linear or straight, portion 39, followed by inwardly, then outwardly, curving portion 40. Such shape of finger 38 is not as artistic as the fingers shown in prior FIGS., but finger 38 functions very well to hold both the large-sized and small-sized containers. Curving portion 40 may be made to curve inwardly and outwardly more than is shown or less than is shown. In the embodiment shown, it is noted that finger 38 curves inwardly until it reaches a position approximately directly above a location on the circumference of base 2. This is so that the fingers will receive and hold containers of regular size as well receiving and holding the large containers, which require the fingers to flex outwardly. Foot 6 may be made longer than shown and portion 39 may be sloped inwardly more than shown, to adapt the holder 1 to fit even larger containers.

Figure 14:
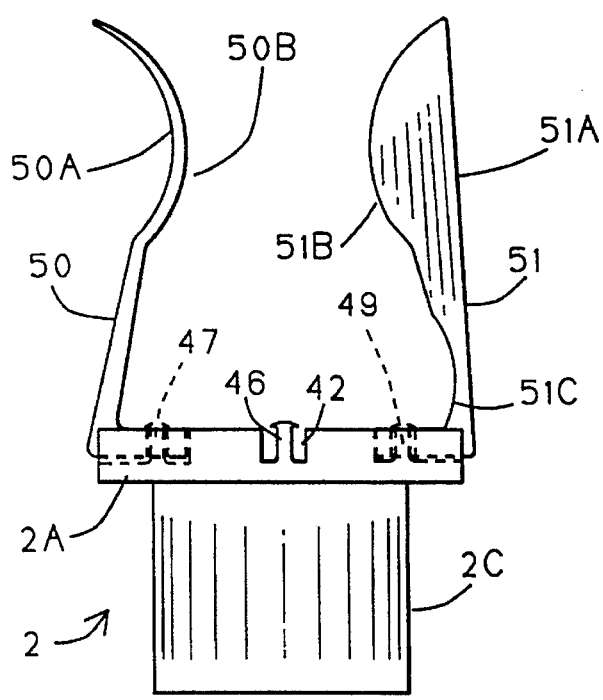
FIG. 14 is a side view of the embodiment of the base shown in FIG. 13.
Figure 13:
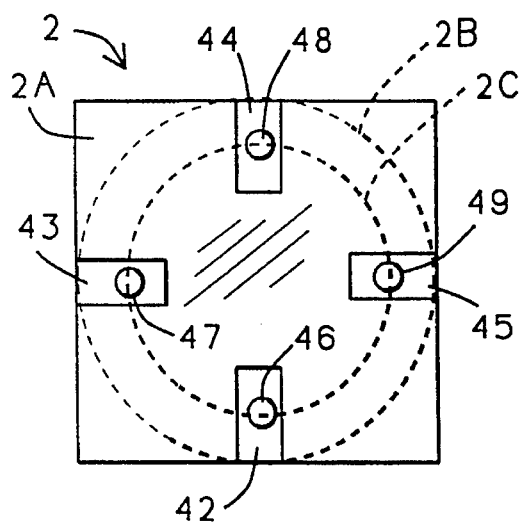
FIG. 13 is a top view of an alternate embodiment of the base.

FIG. 13 is a top view of an alternate embodiment of the base 2 in which cap 2A of base 2 is either square or rectangular. Cap 2A has four recesses 42, 43, 44 and 45 therein to receive the feet of four flexible fingers. Dotted lines illustrate the cylindrical, lower base portion 2C of base 2. Rivets 46, 47, 48 and 49 are provide! d in order to attached flexible fingers to base 2. As shown in FIG. 14, the feet of the flexible fingers would then have holes therein to receive the rivets provided by the base.

FIG. 14 is a side view of the embodiment of base 2 shown in FIG. 13, showing recess 42 and rivet 46 therein. Flexible fingers 50 and 51, show differing shapes of fingers. The ends of fingers 50 and 51 extend outwardly sufficiently to receive the base of large-sized containers between the fingers.

Such fingers 50 and 51 are attached within respective recesses by rivets 47 and 59, shown in dotted lines. It is noted that finger 50 has a straight portion as it extends upward from base cap 2A. Finger 50 then curves inwardly and then outwardly to form inner curve 50B and outer curve 50A. It is noted that inner curve 50B is the significant curve which is adapted to receive the base of a large-sized container between it and the associated fingers. Curve 50A is of little or no significance except in adding to the flexibility of the finger. This may be seen from the shape of finger 51, that it has an inner surface which curves outwardly, that is, inner curve 51A, but the backside of such curve is straight portion 51A. Because of the width of finger 51, it may be necessary to provide a narrowed neck, which is more flexible, as shown at neck 51C.

Curves 50B and 51B preferably extend outwardly far enough to receive the base of the desired largest-sized container within their slopes.

Figure 15:
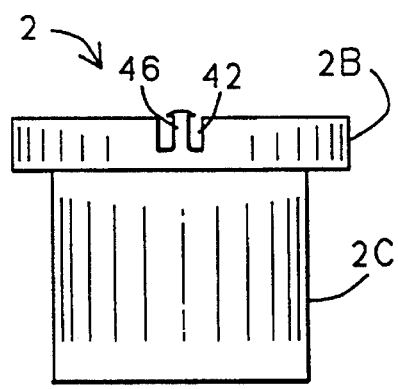
FIG. 15 is a side view of still another embodiment of the base.

FIG. 15 is a side view of still another embodiment of the base 2 in which top portion 2B of base 2 is circular or disklike, and having a larger diameter than lower base portion 2C. Rivet 46 may be seen in recess 42, for attaching the feet of fingers to base 2.

FIG. 16 is the preferred embodiment of the invention, that of FIG. 1, illustrating circumferential dimensions. Dotted line 9 illustrates the circumference of the base of a large-sized container which the holder 1 is adapted to accommodate. Diameter 9A of circumference 9 illustrates that the holder 1 will hold a container substantially larger than the original receptacle. The original receptacle would have an inner diameter of approximately diameter 10, the diameter of base 2.

It is preferable, as explained in connection with FIG. 14 that the curved ends of fingers 3.4 and 5. FIG. 16, extend far enough outwardly to receive the base of the desired large-sized container. If such curved ends do not reach far enough outward, the large-sized containers may still be fit into the container by pressing one or more of the fingers outwardly by hand or by the container as it is inserted. In FIG. 16, the tips of fingers 3, 4 and 5 preferably lie just slightly outside a diameter having the width of diameter 9A. That is, the ends of the fingers 3, 4 and 5 at their curved ends should be farther apart than the other ends of fingers where they commence upward. This is so that the fingers will receive, within their curves, bases of containers at least as large as those that may be held between the fingers at the base.

FIG. 17 is a side view of a base 2 having a cap 2A through which there are holes, such as those shown at 52 and 53. The ends of the fingers, such as end 50C of finger 50, are attached, or connected, to the base 2 by being inserted in a respective hole, such as hole 52, of cap 2A of base 2. In being attached, or connected, to the base, the fingers, such as finger 50, may be simply inserted in respective holes, such as those shown at 52 or 53 or may be adhered, glued or fastened by fastener means as desired. It is noted that finger 50 is of a different shape, being linear, as it extends upwardly from base 2 and then curves outwardly at curved portion 50A. The linear portion of finger 50 is directed inwardly and either the finger 50 or cap 2A, or both, will flex enough to allow the large-size containers to enter the holder and be held. It is noted that finger 50 has shoulder 54 which prevents it from entering hole 52 too deeply or from falling through the hole 52. Of course, the embodiment of FIG. 17 would have one,or more fingers, not shown, in addition to finger 50, which is shown. Linear finger 50 could be used in any of the other embodiments, with suitable changes to its bottom end.

FIG. 18 is a top view perspective of a circular cap 2A showing how the fingers are inserted into the cap. Finger 5 is an example of the preferred finger. Holes 53 and 55 provide locations for additional fingers to be inserted. It is noted that hole 55 is oriented differently within tab 57 as an example that other orientations of the holes within the tabs may be made. Shoulder 54 prevents finger 5 from entering too deeply within cap 2A.

FIG. 19 is a top view of a base 2 having a cap 2A of triangular shape. FIG. 19 also illustrates various configurations of the base. Holes 52. 53 and 55 disposed in tab portions 56, 57 and 58, extending beyond cylindrical, lower base 2C, are adapted to receive and hold respective fingers, which are not shown.

In all embodiments of the invention, cylindrical, lower base 2C may be replaced by a triangular, lower base portion 2D such as shown by dotted lines or by a square or rectangular, lower base portion 2E, also shown in dotted lines. A star type base, shown by dotted lines 2F, 26 and 2H could be used. The dotted lines 2F, 2G and 2H, of course, represent the top edge of walls which would extend from the cap 2A to the bottom of the holder. Further, pentagonal, hexagonal, rhomboidal and other shaped, lower base portions may be used so long as there is sufficient contact by the lower base portion with the receptacle which holds it, to stabilize the holder of the invention.

FIG. 20 is atop view of an alternate embodiment in which the base 2 has tabs 56, 57, and 58 which extend beyond cylindrical, lower base portion 2C. Lower base portion may be any of the shapes discussed or of any other shape suitable for holding it within the caddy or other receptacle. The fingers of the holder are inserted into holes 52. 53 and 54.

It is to be noted in FIGS. 19 and 20 that tabs 56, 57 and 58 may be constructed to be flexible and thus remove the necessity for some or all of the flexibility required of the fingers in other embodiments. If the tabs 56, 57 and 58 are designed to be flexible, they will flex downwardly when a drink container is inserted into the holder, causing the fingers to move outwardly and receive the large-sized drink container. Thus, a clearance for the tabs to flex downwardly should be provided. Referring to FIG. 17, to explain the clearance, the cylindrical, lower base portion 2C, or any other shaped base, may be designed to extend slightly above the drink caddy 60, shown in dotted lines and give a small clearance such as shown at clearance 61 for such tabs to bend downwardly. Very little clearance of the cylindrical, lower base portion 2C, above the drink caddy 60 is required in order to give sufficient space for the tabs to flex.

FIGS. 19 and 20 provide embodiments which are particularly adapted to be constructed out of heavy paper or cardboard, as well as from plastic, cellulose, fiberglass, wood or other materials.

A flat blank of a heavy, stiff cardboard could readily be cut and folded into the shapes of FIGS. 19 or 20. For example, the triangle of FIG. 19, could be cut or stamped out of cardboard and cuts made along lines 2F, 2G and 2H, and the cut portions are then folded downwardly to form the base. The lower base portion then would be comprised of three triangles extending downwardly. The three triangles' bottommost points would be where the lines 2F and 2G come together, where the lines 2G and 2H come together and where the lines 2H and 2F come together.

FIG. 21 is top view of an alternate embodiment of the base 2C, having projecting tabs 56, 57 and 58. Such tabs have holes, or slots, 52, 53 and 55 into which the fingers, such as the finger 50 shown in FIG. 23 or the various other FIGS. herein, are inserted. If tabs 56.57 and 58 are made of stiff material, the fingers must be flexible. On the other hand if the base is made of a heavy, stiff cardboard or like material, and the tabs are flexible, the fingers need not be flexible. Base 2C may, alternately, be in the form shown in dotted lines 2J, 2K and 2L.

FIG. 22 is a base 2C which is stamped or die-cut out of a material which is then folded into the circular or triangular form of the base. The tabs 56, 57 and 58 have holes 52, 53 and 55 therein for the insertion of fingers, after the base is formed and the tabs are bend to lie approximately horizontal. Slots 62 and 63 are one form of connecting the two ends of base 2C, so as to hold it together. The two ends of base 2C may be connected by stapling, adhering or by other connection means.

FIG. 23 is a side view of a finger 50 which may be inserted into the holes such as holes 52, 53 and 55 in the tabs 56,57 and 58 of the base 2C of FIGS. 18 to 22. Should 54 prevents the finger from entering the holes too deeply. Curve 50D is the significant curve which is formed to received the large size container. Finger 50 may be flexible or may be inflexible depending on the flexibility of the tab into which it is inserted. If the tab is flexible, the finger 50 need not be flexible and if the tab is inflexible, the finger 50 needs to be flexible. The finger may have a thick shape as shown by dotted line 50E, which would make it less flexible. Foot 50C is inserted into hole in the base 2C or otherwise aids in attaching finger 50 to a base of other configuration.

FIG. 24 is a holder which is stamped or die-cut out of a material, such as a heavy, stiff cardboard, which is then folded into the form of the holder. The base 2C is formed by folding four folds, into the shape shown in FIG. 25 which is a bottom view of the folded base 2C. Fingers 50 and 51 are cut so that they may be folded upwardly above base 2A. Struts 64 and 66 fold along dotted lines 64C and 66D, respectively, and hold fingers 50 and 51 in place. The projections 64A and 66A are inserted into slots 68 and 70 in fingers 50 and 51, respectively. The struts 64 and 66 are held to fingers 50 and 51 by locking tabs 64B and 66B which are folded along lines 64D and 66C, respectively, to interlock with fingers 50 and 51. The folds and structure, of finger 51, strut 66, locking arm 66B and projection 66A when folded into place may be seen in FIG. 26.

Referring to both FIGS. 24 and 26, center strut 65 folds at dotted line 65C and 65E. Projection 65D is inserted into hole 69 and the side view of the structure may be seen in FIG. 26. Center strut 65 forms a back abutment for the container 9, partially shown in dotted lines, inserted into the holder.

FIG. 25 is a bottom view of the base 2C of FIG. 24, after it is folded into its base configuration, to fit within caddy receptacle 60, shown in dotted lines.

Although specific embodiments and certain structural arrangements have been illustrated and described herein, it will be clear to those skilled in the art that various other modifications and embodiments may be made incorporating the spirit and scope of the underlying inventive concepts and that the same are not limited to the particular forms herein shown and described except insofar as determined by the scope of the appended claims.

I claim:

1. A holder for a container, said holder comprising a base and two or more fingers, said fingers each having a bottom end and a top end, each said bottom end being fixedly attached with respect to said base and said fingers extending upwardly from a position outwardly beyond said base and wherein said fingers curve outwardly at or near their top ends and wherein said base extends substantially below the bottom ends of said fingers and wherein said base is adapted to be inserted in a receptacle and hold said fingers upright.

2. A holder for a container, said holder comprising a base and two or more fingers attached to said base, said fingers each having a bottom end and a top end, said fingers extending upwardly from said base and wherein said fingers curve outwardly at or near their top ends and wherein said base extends subtantially below the bottom ends of said fingers and wherein said base is adapted to be inserted in a receptacle and hold said fingers upright and wherein said fingers are flexible and wherein each said finger has a foot and said base has two or more recesses and wherein each said foot is attached to said base within a respective said recess and wherein each said foot fixedly rests at least in part upon said base within said recess and wherein said base has an upper surface and each said foot has an upper surface approximately flush with said upper surface of said base, whereby said surfaces are adapted to provide a surface for receiving the bottom of a container.

3. A holder for a container, said holder comprising a base and two or more fingers attached to said base, said fingers each having a bottom end and a top end, said fingers extending upwardly from said base and wherein said fingers curve outwardly at or near their top ends and wherein said base extends substantially below the bottom ends of said fingers and where in said base is adapted to be inserted in a receptacle and hold said fingers upright and wherein each said finger has a horizontal foot having an inward end and an outward end and wherein said fingers are attached to said base by said foot, and wherein each said horizontal foot extends outwardly beyond said base and fixedly rests at least in part upon said base, each said finger then extending upwardly from the outward end of its said foot.

4. A holder for a container, said holder comprising a base and two or more fingers attached to said base, said fingers each having a bottom end and a top end, said fingers extending upwardly from said base and wherein said fingers curve outwardly at or near their top ends and wherein said base extends substantially below the bottom ends of said fingers and wherein said base is adapted to be inserted in a receptacle and hold said fingers upright and wherein is included removable collar means for circumferentially fitting said base and adapting said base to fit a larger receptacle than said base would otherwise fit and wherein said collar means has a height and wherein said collar means is fitted to said base throughout said height of said collar.

5. A holder for a container wherein is included a base comprised of a lower base portion and a cap having two or more tabs extending beyond said lower base portion, a hole through each said tab two, or more fingers extending upwardly from said base, each said finger inserted into a respective hole in said tabs, each said finger having an end near said cap and a far end farther away from said cap, each said finger having an inner surface which curves outwardly at said far end.

6. The holder of claim 5 wherein each said finger, in extending upwardly, first extends linearly and is directed inwardly.

7. The holder of claim 5 wherein one or more of said tabs and said fingers are flexible.

8. The holder of claim 5 wherein one or more of said fingers and said tabs are flexible and wherein said fingers, in extending upwardly from said tab, first curve outwardly and then curve inwardly, said fingers thereby being "S"-shaped.

* * * * *